Sept. 4, 1945.   J. STUCKE   2,383,996
POWER PLANT
Filed March 6, 1944   5 Sheets-Sheet 1

Inventor
John Stucke

Sept. 4, 1945.　　　J. STUCKE　　　2,383,996
POWER PLANT
Filed March 6, 1944　　　5 Sheets-Sheet 2

Inventor
John Stucke
By Clarence A. O'Brien
and Harvey B. Jacobson
Attorneys

Sept. 4, 1945.  J. STUCKE  2,383,996
POWER PLANT
Filed March 6, 1944  5 Sheets-Sheet 3

Inventor
John Stucke
By Clarence A. O'Brien
and Harvey B. Jacobson
Attorneys

Sept. 4, 1945. J. STUCKE 2,383,996
POWER PLANT
Filed March 6, 1944 5 Sheets-Sheet 4

Inventor
John Stucke
By Clarence A. O'Brien
and Harvey B. Jacobson
Attorneys

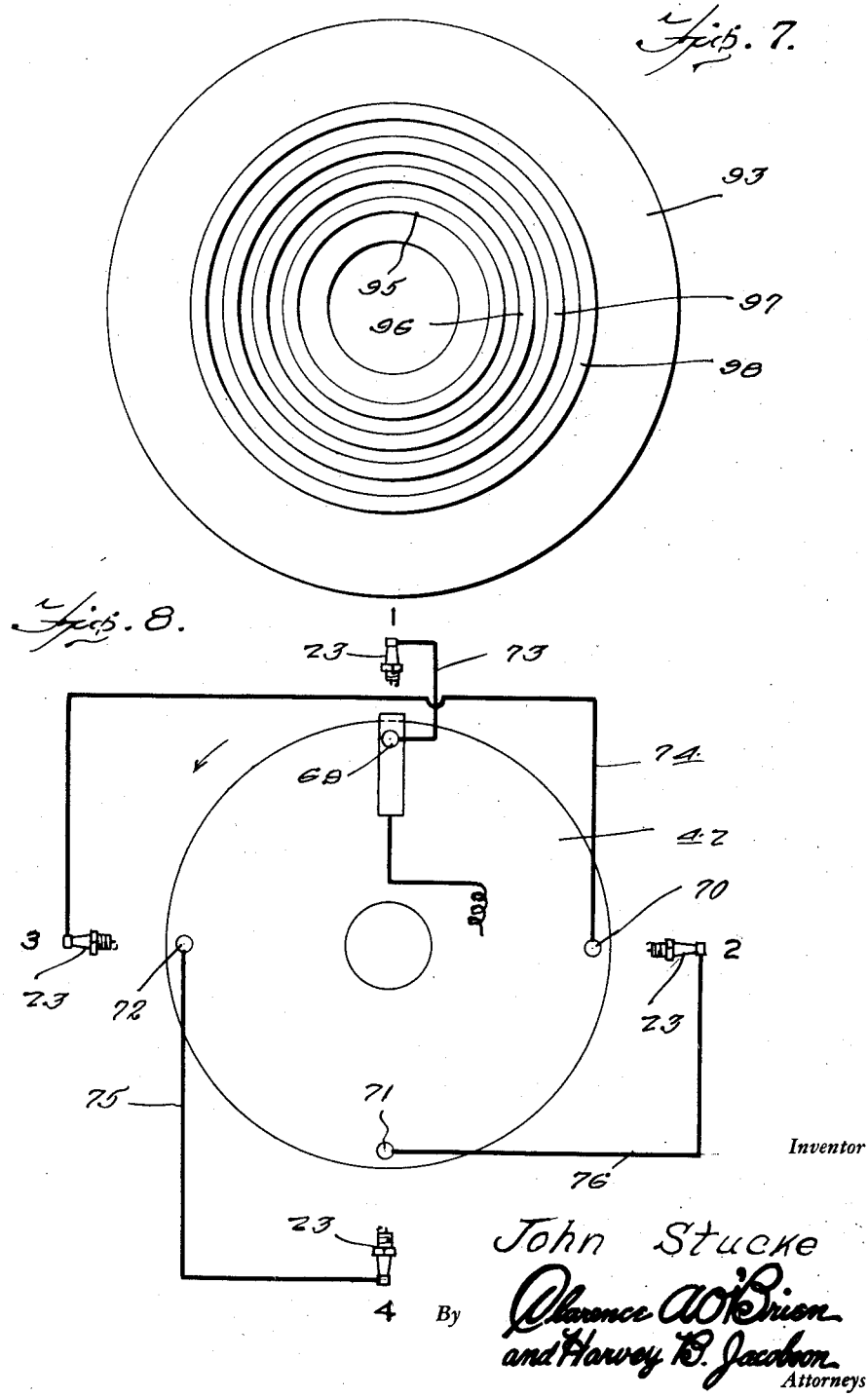

Patented Sept. 4, 1945

2,383,996

UNITED STATES PATENT OFFICE 2,383,996

POWER PLANT

John Stucke, Philadelphia, Pa.

Application March 6, 1944, Serial No. 525,235

4 Claims. (Cl. 290—1)

My invention relates to improvements in power plants, the primary object in view being to combine a rotary internal combustion engine and an electric generator into a single unit in which the electric generator is operated directly by the internal combustion engine with the field revolving in one direction and the armature revolving in the opposite direction, and so that the output capacity of the generator is substantially doubled as compared with present day generators, and the field and armature function to balance operation of the engine.

Other and subordinate objects are also comprehended by my invention, all of which, together with the precise nature of my improvements, will be readily understood when the succeeding description and claims are read with reference to the drawings accompanying and forming part of this specification.

Figure 1:
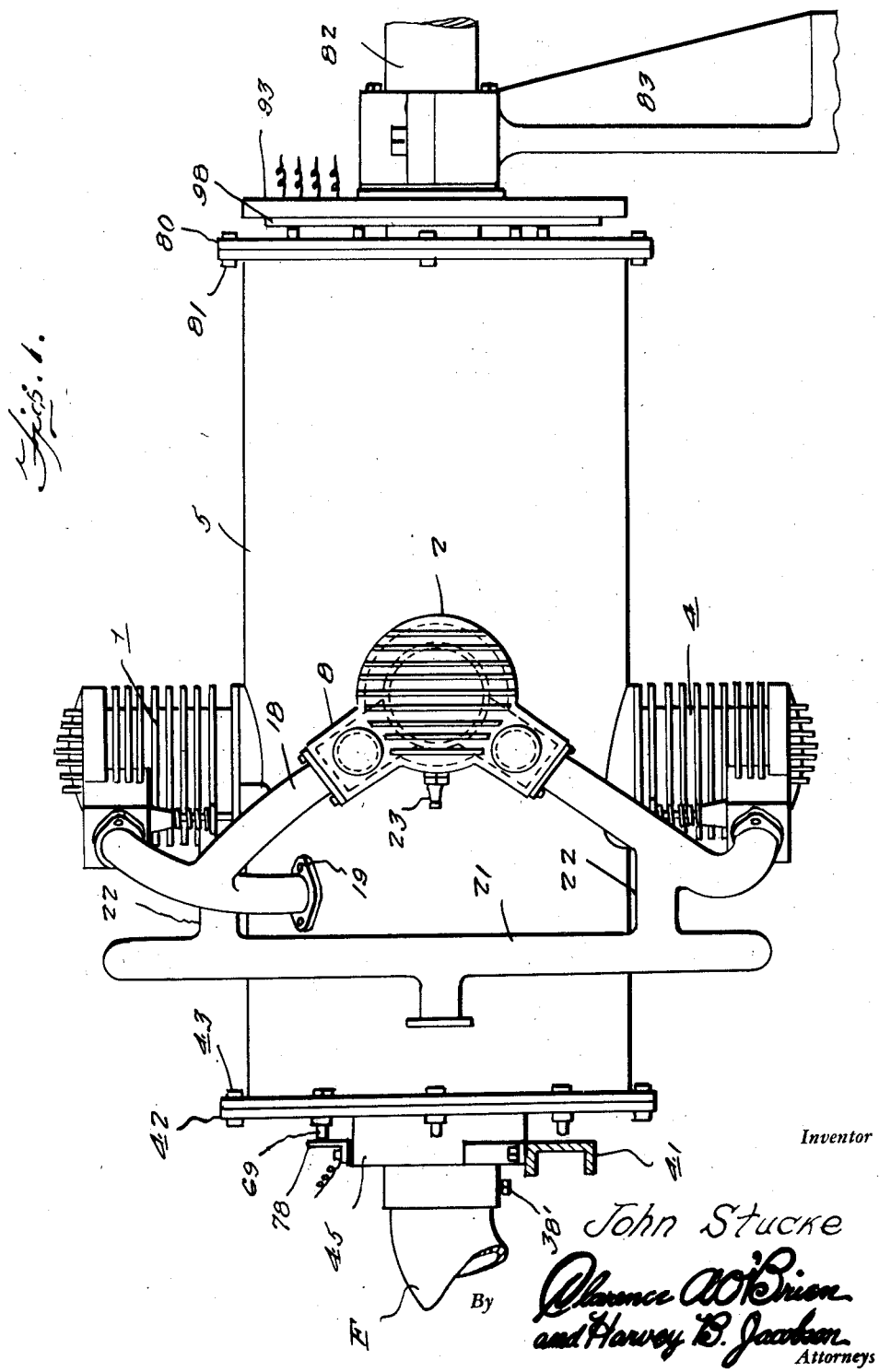
Figure 2:
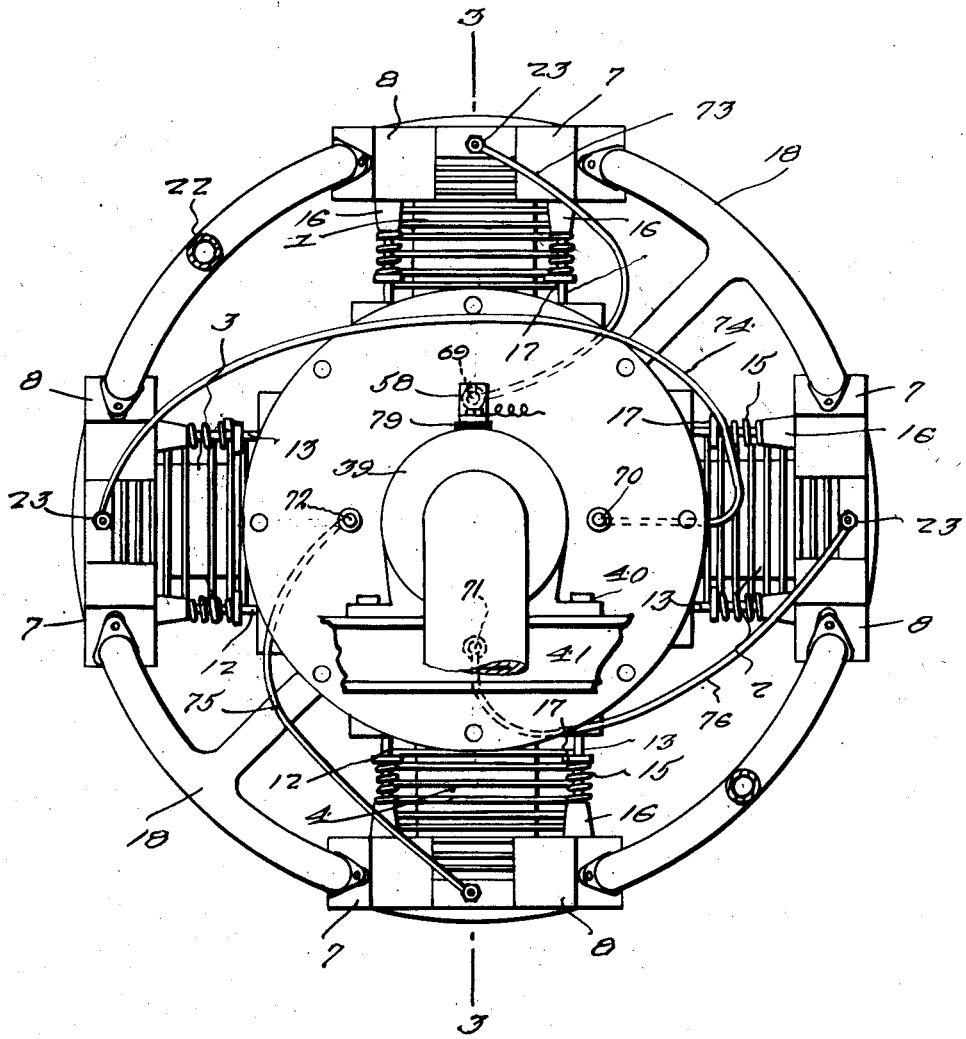
Figure 3:
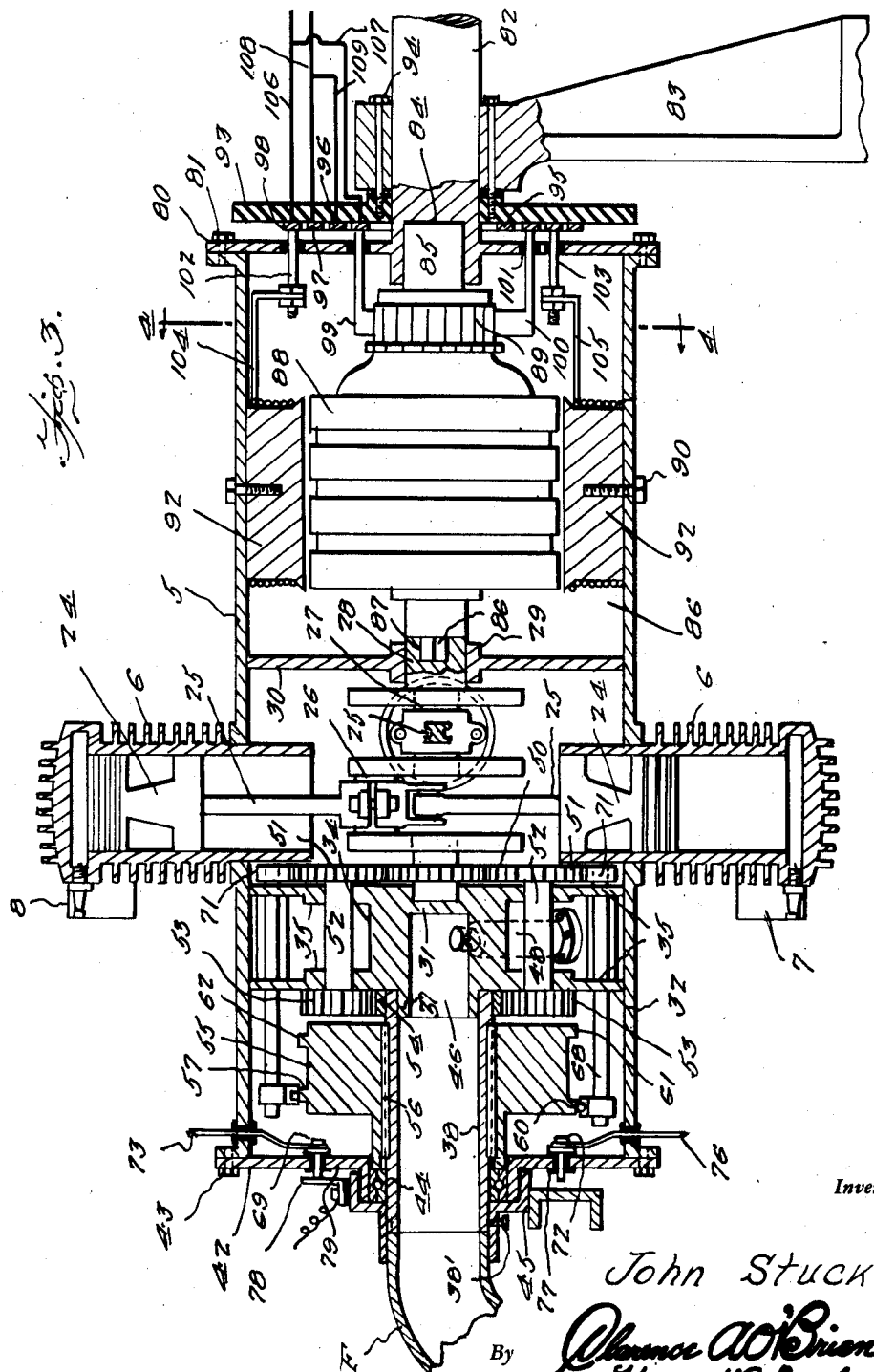
Figure 4:
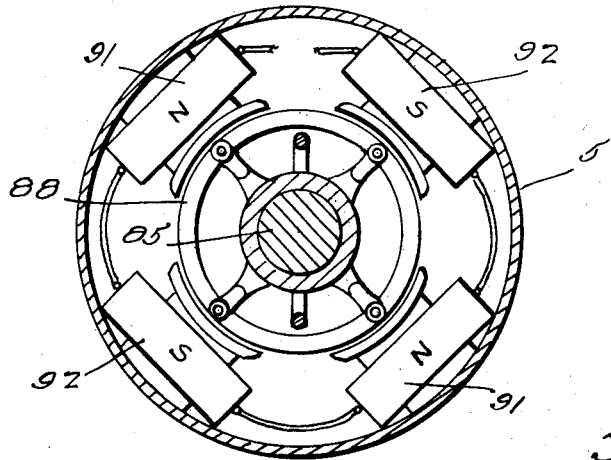
Figure 5:
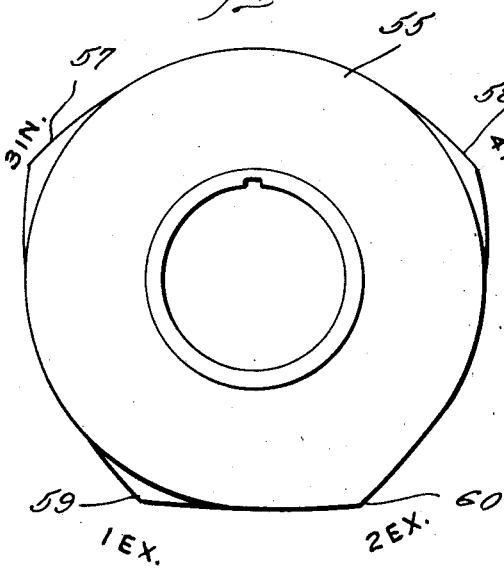
Figure 6:
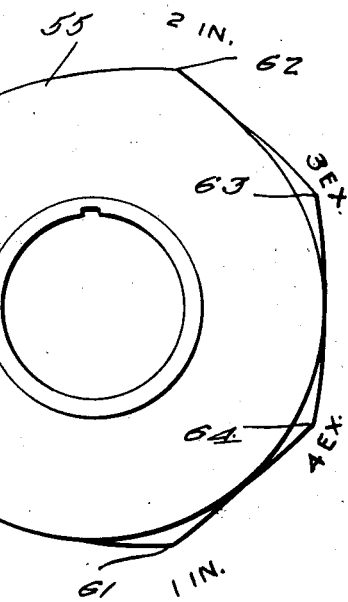

In said drawings:

Figure 1 is a view in side elevation of my improved power plant, in its preferred embodiment, Figure 2 is a view in front end elevation drawn to an enlarged scale, Figure 3 is a view in longitudinal vertical section taken on the line 3—3 of Figure 2, Figure 4 is a view in transverse section taken on the line 4—4 of Figure 3, Figure 5 is a diagrammatic view of the cam-carrying disc, Figure 6 is a similar view, Figure 7 is a view in front elevation of the collector ring plate, and Figure 8 is a diagrammatic view of the ignition circuit.

Referring to the drawings by numerals, the internal combustion engine of my improved power plant is similar, with the exceptions presently noted, to that forming the subject matter of my copending application Serial No. 460,663, filed October 3, 1942.

In common with the engine of said application, the engine of the instant power plant comprises four cylinders designated 1, 2, 3, 4 extending radially from a cylindrical, rotary, horizontally disposed casing 5, said cylinders being grouped around said casing 5 in 90° angular relation and in diametrically disposed pairs intermediate the transverse center of said casing and what constitutes the front end of the casing. The pairs of cylinders 1, 2, 3, 3, 4 are staggered longitudinally of the casing 5, suitably fixed therein, and provided with the usual cooling fins 6.

Each cylinder 1, 2, 3, 4 is provided on the side thereof facing the front end of the casing 5 with a pair of radial, divergent castings 7, 8 forming intake and exhaust valve chambers therein, not shown, for a pair of the usual poppet-type intake and exhaust valves 12, 13, respectively, normally closed by the usual coil springs 15 interposed between valve guides 16 on said castings and collars 17 on said valves.

Suitable intake manifold pipes 18 extend between the castings 7 forming the intake valve chambers and connect said chambers in pairs, said pipes being bolted, as at 19, to the casing 15 to receive the carbureted fuel in a manner presently described.

An annular exhaust manifold 21 surrounds the casing 5 and is provided with branches 22 extending between the castings 8 forming the exhaust chambers, said branches connecting said chambers in pairs.

Suitable spark plugs 23 extend laterally into the outer ends of the cylinders 1, 2, 3, 4 between the castings 7, 8 of each cylinder.

The pistons 24 of the cylinders 1, 2, 3, 4 are connected, by connecting rods 25, in diametrically opposite pairs to a pair of cranks 26, 27 disposed in 90° angular relation, side by side, on the crankshaft 28 extending axially in the casing 5.

The rear end of the crankshaft 28 is journaled in a bearing 29 formed axially in a transverse partition wall 30 suitably fixed in the casing 5 in the transverse center thereof. The front end of the crankshaft 28 is journaled in a stepped bearing 31 formed in a spider 32 suitably fixed in the casing 5 to extend transversely thereof and including a hub 34 and radial side-by-side pairs of arms 35 arranged, as shown in Figure 3, in diametrically opposite pairs and the function of which will presently appear.

The casing 5 is rotatably supported at its front end, as follows: Extending axially from the hub 34 of the spider 32 out of the front end of said casing and having its inner end telescopically fitted over a bearing flange 37 on said hub is a tubular shaft 38 in which the flange 37 is rotatably fitted. The shaft 38 has its front end fixed, as by a set screw 38', in a bearing 39 bolted, as at 40, to a suitable frame, represented at 41. An annular, front end head 42 is bolted to the casing 5, as at 43, and supported by a roller bearing unit 44 surrounding the shaft 38 within a circular housing 45 forming part of the bearing 39 and serving an additional purpose presently explained.

The shaft 38 opens into an axial chamber 46 in the hub 34 of the spider 32. A pair of diametrically opposite ports, one of which is shown at 47, in said hub 34 communicate with a pair of radially arranged fixed inlet pipes, one of which is shown at 48 in Figure 3, and which are suitably secured to said hub and bolted, as at 49, to the casing 5 to communicate with the before mentioned manifold pipes 18. A fitting F extending from a carburetor, not shown, is mounted in the bearing 39 in communication with the outer end of the shaft 38.

The manner in which the rear end of the casing 5 is rotatably mounted will be presently described in connection with the electric generator.

The casing 5 is rotated oppositely, i. e., counter-clockwise as viewed in Figure 3, relative to the direction of rotation of the crankshaft 28, i. e., clockwise, and at the same speed by means of a planetary gear drive which may be briefly described as follows: A driven gear 50 is fast on the front end of the crankshaft 28 to mesh with gears 51 fast on shafts 52 journaled in the spider arms 35, as shown in Figure 3, to extend parallel with said shafts 26, the shafts 52 having fast thereon planetary gears 53 meshing with a sun gear 54 fast on the rear end of the shaft 38.

The intake and exhaust valves 12, 13 are operated, under rotation of the casing 5, by two series of side-by-side peripheral cams on a disc 55 keyed, as at 56, on the shaft 38. Each series includes four cams circumferentially spaced around the disc in laterally staggered relation. As shown in Figure 5, one series includes a pair of cams 57, 58 for operating the intake valves 12 of cylinders 3, 4 and a pair of cams 59, 60 for operating the exhaust valves 13 of cylinders 1 and 2. The other series includes a pair of cams 61, 62 for operating the intake valves 12 of cylinders 1, 2, and a pair of cams 63, 64 for operating the exhaust valves of cylinders 3, 4. The valve-operating cams 57, 58, 59, 60, 61, 62, 63, 64 are designed to operate the related valves through the medium of suitable rock shafts, as at 67, 68, spaced around the disc 55 and journaled in the spider arms 35. Rocker arms 71 on said shafts 67, 68 are provided for operating the appropriate valves, and similar rocker arms 76 on said shafts are operated by the appropriate cams 57 to 64, as the case may be.

The ignition means comprises a circular series of four contacts 69, 70, 71, 72 on the front end head 42 arranged in 90° angular relation and connected to the spark plugs 23 of cylinders 1, 3, 2, 4 by leads 73, 74, 75, 76, respectively. The contacts 69, 70, 71, 72 are suitably insulated, as at 77, from the front end head 42 and are arranged to wipe past a fixed resilient contact 78 suitably secured on the before mentioned housing 45, the contacts 69 to 72 each engaging the contact 78 in a cycle of operation of the engine. The fixed contact 78 is suitably insulated, as at 79, from said housing 45 and designed to be connected to a suitable source of electrical energy, not shown.

The foregoing engine structure, with the exception of the ignition, and the fixed cam disc 55 is substantially the same as featured in my aforesaid copending application.

Coming now to the electric generator combined with the engine structure described, the rear end of the casing 5 is closed by a rear end, disc-like head 80 bolted to the casing 5, as at 81, and formed integrally, preferably, with an axial power take-off shaft 82 journaled in an upstanding fixed bearing bracket 83, whereby the rear end of said casing 5 is rotatably supported. The power take-off shaft 82 is formed with an inner end bearing 84 in which is suitably mounted one end of an armature shaft 85 aligned with the shafts 28, 82 in a compartment 86 formed in the casing 5 by the partition wall 30 and end head 80, the other end of the armature shaft 85 having a reduced, polygonal end 86 fitted in a similar socket 87 provided in the rear end of the crankshaft 28. Thus, the armature shaft 85 is coupled to the crankshaft 28 for rotation thereby. The armature shaft 85 is equipped, within the compartment 86, with a suitable armature 88 and commutator unit 89.

Suitably secured to the casing 5, by bolts 90, and spaced circumferentially around the armature 88, within the compartment 86, are north and south poled field magnets 91, 92 illustrated generally in Figure 4.

Surrounding the power take-off shaft 82 is an annular, disc-like collector ring-carrying plate 93 of insulation bolted to the bearing bracket 83, as at 94, and arranged between the end head 80 and said bracket. Suitably secured to one face of the plate 93 in concentric, spaced-apart relation thereon, are collector rings 95, 96, 97, 98 successively larger in diameter. A pair of suitable brushes 99, 100 extend from diametrically opposite sides of the commutator unit 89 out of said end head 80 into wiping engagement with the smallest and next larger collector rings 95, 96. The brushes 99, 100 are suitably fixed in insulation mountings 101 in the end head 80 for rotation with the same and with the casing 5. A pair of brushes 102, 103 are extended through the end head 80 in the same manner as the brushes 99, 100 for wiping engagement with the outermost, largest collector ring 98 and the next smaller one 97, and are suitably connected to the field, formed by the field magnets 91, 92, by wires 104, 105. As will be seen, the collector rings 95, 96 are interposed in one side of the generator and the rings 97, 98 in the other side. One side 106 of a power output line is suitably connected to the rings 98, 95, as by leads 106, 107, and the other side of the line is connected to the rings 97, 96 by the leads 108, 109.

Referring now to the operation of my invention, with the parts in the position shown, with cylinder 1 uppermost and, let it be assumed, in zero position in the cycle of operation, cylinder 1 fires on top or zero position, cylinder 3 fires next at 180° in the cycle, cylinder 2 fires next at 270° in the cycle, and cylinder 4 at 270° in the cycle. Since, as before stated, the crankshaft 28 rotates clockwise, the armature 88 and commutator unit 89 will be similarly rotated through the medium of the armature shaft 85 coupled to the crankshaft 28 in the manner described. The casing 5 being, as before set forth, rotated counter-clockwise, through the medium of the planetary gear drive, previously described, similarly rotates the field magnets 91, 92 around the armature 88 and, through the medium of the end head 80, rotates the brushes 99, 100, 102, 103 relative to the collector rings 95, 96, 97, 98 in wiping engagement therewith.

As will be understood, the armature 88 serves as a balance wheel for the crankshaft 28, and the described field serves in a similar capacity for the casing 5 and the power take-off shaft 82.

The described arrangement of cylinders and field magnets rotating in synchronism in one direction, and that of the crankshaft and armature rotating in synchronism in the other direction provide for the cylinders operating evenly in one cycle of operation of the engine and for the loops of the armature to empty and fill twice as fast as in the usual generator.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with a rotary cylindrical casing of an internal combustion engine, of an axial rotary crankshaft in said casing terminating at one end between the ends of said casing, of an electric generator incorporated in said casing adjacent said end of the crank shaft and axially aligned with the same, said generator including a field and an armature unit rotatable in opposite directions with respect to each other by said casing and crankshaft, respectively, the armature being directly coupled to said end of said shaft.

2. The combination with a rotary cylindrical casing of an internal combustion engine, an axial rotary crankshaft in said casing, of an electric generator including a field and an armature unit rotatable in opposite directions with respect to each other by rotation of said casing and crankshaft, respectively, brushes wired to said field and revolved thereby, and collector rings outside the casing wipingly engaged by said brushes.

3. The combination with a cylindrical casing of an internal combustion engine rotatable in one direction, of an axial crankshaft in said casing rotatable in the opposite direction, of an electric generator including a field fixed in said casing for rotation thereby, and an armature unit fixed to said crankshaft for rotation therewith, and including a commutator in said casing, commutator brushes revolved under rotation of said armature, and stationary collector rings outside said casing with which said brushes wipingly engage.

4. The combination with a cylindrical rotary casing of an internal combustion engine rotatable in one direction, and an axial crankshaft in said casing rotatable in the opposite direction, of an electric generator including a field fixed in one end of said casing for rotation thereby, an armature unit fixed to the crankshaft for rotation thereby and including a commutator, a series of collector rings mounted in fixed position at said end of the casing, brushes wired to said field and revolved under rotation of the field in wiping engagement with rings of said series, commutator brushes revolved under rotation of said armature unit in wiping engagement with other rings of said series, and a power output line extending from said rings.

JOHN STUCKE.